United States Patent
Xu

(10) Patent No.: US 9,715,303 B2
(45) Date of Patent: Jul. 25, 2017

(54) IN-CELL SELF CAPACITIVE TOUCH CONTROL DISPLAY PANEL AND MANUFACTURE METHOD THEREOF

(71) Applicant: Shenzhen China Star Optoelectronics Technology Co., Ltd., Shenzhen (CN)

(72) Inventor: Xiangyang Xu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 193 days.

(21) Appl. No.: 14/781,592

(22) PCT Filed: Aug. 24, 2015

(86) PCT No.: PCT/CN2015/087959
§ 371 (c)(1),
(2) Date: Oct. 1, 2015

(87) PCT Pub. No.: WO2017/020367
PCT Pub. Date: Feb. 9, 2017

(65) Prior Publication Data
US 2017/0153740 A1    Jun. 1, 2017

(30) Foreign Application Priority Data

Aug. 3, 2015   (CN) .......................... 2015 1 0484037

(51) Int. Cl.
*G06F 3/044* (2006.01)
*G09G 3/36* (2006.01)
(Continued)

(52) U.S. Cl.
CPC .......... *G06F 3/0416* (2013.01); *G02F 1/1368* (2013.01); *G02F 1/13338* (2013.01);
(Continued)

(58) Field of Classification Search
CPC ........ G06F 3/041–3/1416; G06F 3/044; G06F 3/04103; G06F 3/0411
See application file for complete search history.

(56) References Cited

U.S. PATENT DOCUMENTS

2016/0187696 A1* 6/2016 Kim .................... G02F 1/13338
349/12
2016/0266677 A1* 9/2016 Liu ......................... G06F 3/044

\* cited by examiner

*Primary Examiner* — Sanghyuk Park
(74) *Attorney, Agent, or Firm* — Leong C. Lei

(57) ABSTRACT

The present invention provides an in-cell self capacitive touch control display panel and a manufacture method thereof. The in-cell self capacitive touch control display panel comprises: an array substrate, a CF substrate and a liquid crystal layer arranged between the array substrate and the CF substrate, and light is incident from a CF substrate side, and exits out of an array substrate side. The array substrate comprises: a plurality of gate scan lines (11) separately arranged along a horizontal direction, a plurality of data lines (41) separately arranged along a vertical direction, and a plurality of pixel electrodes (50) aligned in array; a touch scanning line is commonly shared with the gate scan line (11), and a touch receiving line is commonly shared with the data line (41), and a touch control self capacitance is commonly shared with the pixel electrode (50), under the premise of not adding more to the present process flow of the array substrate, the in-cell self capacitive touch control function can be realized and the driving cost of the panel can be reduced. The manufacture method of the in-cell self capacitive touch control display panel can reduce the driving cost of the panel without adding more to the present process flow of the array substrate.

11 Claims, 7 Drawing Sheets

(51) Int. Cl.
  *G06F 3/041* (2006.01)
  *G02F 1/1333* (2006.01)
  *G02F 1/1362* (2006.01)
  *G02F 1/1368* (2006.01)
  *G02F 1/1335* (2006.01)
  *G02F 1/1343* (2006.01)

(52) U.S. Cl.
  CPC .... *G02F 1/13439* (2013.01); *G02F 1/133345* (2013.01); *G02F 1/133514* (2013.01); *G02F 1/136286* (2013.01); *G06F 3/044* (2013.01); *G06F 3/0412* (2013.01); *G02F 2001/136295* (2013.01); *G02F 2201/121* (2013.01); *G02F 2201/123* (2013.01); *G02F 2201/50* (2013.01); *G02F 2202/103* (2013.01); *G06F 2203/04103* (2013.01); *G06F 2203/04111* (2013.01)

IN-CELL SELF CAPACITIVE TOUCH CONTROL DISPLAY PANEL AND MANUFACTURE METHOD THEREOF

FIELD OF THE INVENTION

The present invention relates to a display technology field, and more particularly to an in-cell self capacitive touch control display panel and a manufacture method thereof.

BACKGROUND OF THE INVENTION

With the rapid development of the display technology, the touch control display panel has been widely applied and accepted, used by the people. For example, the smart phone, the flat panel computer and etc. all use the touch control display panel. The touch control display panel is to combine the touch control panel and the liquid display panel as one to make the liquid crystal display panel equipped with functions of display and sensing the touch control inputs at the same time.

Generally, the liquid crystal panel mainly comprises a Color Filter (CF), a Thin Film Transistor Array Substrate (TFT Array Substrate) and a Liquid Crystal Layer positioned inbetween. The working principle is that the light of backlight module is reflected to generate images by applying driving voltages to the two glass substrate for controlling the rotations of the liquid crystal molecules. According to the orientation of the liquid crystal, the liquid crystal display panels in the mainstream market can be categorized into several types, which are Vertical Alignment (VA), Twisted Nematic (TN) or Super Twisted Nematic (STN), In-Plane Switching (IPS) and Fringe Field Switching (FFS). In the IPS type liquid crystal display panel, the liquid crystal molecules are oriented to be parallel relative to the substrate surface, and by applying the transverse electrical field for controlling the rotations of the liquid crystal molecules.

The TFT array substrate is an important component of the liquid crystal display panel. The TFT substrate generally comprises data lines, scan lines, common electrode lines, common electrodes, pixel electrodes and TFTs. Each pixel is electrically coupled to one TFT. The Gate of the TFT is coupled to a horizontal scan line, and Source of the TFT is coupled to a vertical data line, and the Drain is coupled to the pixel electrode. The enough voltage is applied to the level scan line, and all the TFTs electrically coupled to the scan line are activated. Thus, the signal voltage on the data line can be written into the pixel to control the transmittances of different liquid crystals to achieve the display effect.

The touch control display panels can be categorized into four types of resistive, capacitive, optics, surface acoustic wave according to the sensing technology. At present, the main stream touch control technology is the capacitive type. The capacitive type can be further categorized into self capacitive type and mutual capacitive type. The touch display panel can be categorized according to different structures into: On cell, In Cell and Out Cell. The In Cell touch display panel possesses many advantages of being light and thin, frame free and achievable of full plane design, and becomes the research hot spot in the present touch control technology field.

The in-cell self capacitive touch control display panel according to prior art generally requires one set of touch control circuit (including the touch scanning line, the touch receiving line and the touch control self capacitance) and the driving control part to realize the in-cell self capacitive touch control function. There is a certain difficulty degree for the manufacture processes of the panel and the driving cost of the panel is higher.

SUMMARY OF THE INVENTION

An objective of the present invention is to provide an in-cell self capacitive touch control display panel, of which under the premise of not adding more to the present process flow of the array substrate, the in-cell self capacitive touch control function can be realized and the driving cost of the panel can be reduced.

Another objective of the present invention is to provide a manufacture method of the in-cell self capacitive touch control display panel can reduce the driving cost of the panel without adding more to the present process flow of the array substrate.

For realizing the aforesaid objectives, the present invention provides an in-cell self capacitive touch control display panel, comprising: an array substrate, a CF substrate and a liquid crystal layer arranged between the array substrate and the CF substrate, and light is incident from a CF substrate side, and exits out of an array substrate side;

the array substrate comprises: a plurality of gate scan lines separately arranged along a horizontal direction, a plurality of data lines separately arranged along a vertical direction, and a plurality of pixel electrodes aligned in array, and the plurality of gate scan lines separately arranged along the horizontal direction and the plurality of data lines separately arranged along the vertical direction are mutually insulated and staggered to divide a plurality of sub pixel areas; each pixel electrode is correspondingly located in one sub pixel area;

a touch scanning line is commonly shared with the gate scan line, and a touch receiving line is commonly shared with the data line, and the touch control self capacitance is commonly shared with the pixel electrode;

time of one frame of image is divided into a display period and a touch control period; in the display period, the gate scan line transmits a gate scan signal, and the data line transmits a pixel gray scale signal, and the pixel electrode is employed to form a storage capacitor and a liquid crystal capacitor; in the touch control period, the gate scan line is employed to be the touch scanning line to transmit a touch scanning signal, and the data line is employed to be the touch receiving line to sense a touch signal, and the pixel electrode is employed to be the touch control self capacitance.

The array substrate further comprises: a TFT located correspondingly to each pixel electrode, and common electrodes located opposite to the pixel electrodes;

a gate isolation layer covering the gate scan line, a gate of the TFT, and the data line is located on the gate isolation layer, and an island shape active layer of the TFT is located on the gate isolation layer, and a source and a drain of the TFT are respectively coupled to the island shape active layer, and the pixel electrode is located on the gate isolation layer and coupled to a drain of the TFT, and an insulation protective layer covering the data line, the pixel electrode, the source and the drain of the TFT, and the common electrode is paved on the insulation protective layer.

The pixel electrode is flat, and the common electrode has a whole sheet structure covering all the sub pixel areas; the common electrode is provided with a plurality of long strip via holes in a region corresponding to each pixel electrode.

All materials of the gate scan line, the data line, and the gate, the source, the drain of the TFT are one or more combination of molybdenum, aluminum and copper, and all thicknesses are 3000-6000 Å.

Both materials of the pixel electrode and the common electrode are ITO, and both thicknesses are 400-1000 Å.

Both materials of the gate isolation layer and the insulation protective layer are Silicon Nitride, and both thicknesses are 2000-5000 Å; material of the island shape active layer is amorphous silicon and n-type heavy doped amorphous silicon, and a thickness of the island shape active layer is 1500-3000 Å.

The present invention further provides a manufacture method of an in-cell self capacitive touch control display panel, comprising steps of:

step 1, providing a substrate and deposing a first metal layer on the substrate, and implementing pattern process to the first metal layer to form a gate scan line and a gate in one with the gate scan line;

the gate scan line is also employed to be a touch scanning line;

step 2, deposing a gate isolation layer on the gate scan line and the gate, and deposing a semiconductor layer on the gate isolation layer, then implementing pattern process to the semiconductor layer to form an island shape active layer;

step 3, deposing a second metal layer on the island shape active layer and the gate isolation layer, then implementing pattern process to the second metal layer to form a data line, a source in one with the data line and connected with the island shape active layer, and a drain connected to the island shape active layer;

the gate, the source, the drain and the island shape active layer construct a TFT;

the data line is also employed to be a touch receiving line;

step 4, deposing a first transparent conductive thin film on the gate isolation layer, the data line, the source and the drain, then implementing pattern process to the first transparent conductive thin film to form a plurality of pixel electrodes aligned in array, and each pixel electrode is correspondingly coupled to the drain of one TFT;

the pixel electrode is also employed to be a touch control self capacitance;

step 5, deposing an insulation protective layer on the data line, the pixel electrode, the source and the drain, and implementing pattern process to the insulation protective layer;

step 6, deposing a second transparent conductive thin film on the insulation protective layer, and implementing pattern process to the second transparent conductive thin film to form a whole sheet common electrode located opposite to all the pixel electrodes, and the whole sheet common electrode is provided with a plurality of long strip via holes in a region corresponding to each pixel electrode.

manufacture of the array substrate is accomplished;

step 7, providing a CF substrate, and oppositely assembling the CF substrate and the array substrate, and injecting liquid crystals to form a liquid crystal layer.

In the step 1, the first metal layer is deposed by physical vapor deposition, and the pattern process to the first metal layer comprises photoresist coating, and implementing exposure, development, wet etching and photoresist stripping with a mask;

in the step 2, the gate isolation layer and the semiconductor layer are deposed by plasma enhanced chemical vapor deposition, and the pattern process to the semiconductor layer comprises photoresist coating, and implementing exposure, development, dry etching and photoresist stripping with a mask;

in the step 3, the second metal layer is deposed by physical vapor deposition, and the pattern process to the second metal layer comprises exposure, development, wet etching and photoresist stripping;

in the step 4, the first transparent conductive thin film is deposed by physical vapor deposition, and the pattern process to the first transparent conductive thin film comprises exposure, development, wet etching and photoresist stripping;

in the step 5, the insulation protective layer is deposed by plasma enhanced chemical vapor deposition, and the pattern process to the insulation protective layer comprises photoresist coating, and implementing exposure, development, dry etching and photoresist stripping with a mask;

in the step 6, the second transparent conductive thin film is deposed by physical vapor deposition, and the pattern process to the second transparent conductive thin film comprises photoresist coating, and implementing exposure, development, wet etching and photoresist stripping.

Material of the first metal in the step 1, material of the second metal layer in the step 3 are one or more combination of molybdenum, aluminum and copper, and thicknesses are 3000-6000 Å.

Material of the gate isolation layer in the step 2, material of the insulation protective layer in the step 5 are Silicon Nitride, and thicknesses are 2000-5000 Å; material of the semiconductor layer in the step 2 is amorphous silicon and n-type heavy doped amorphous silicon, and a thickness of the island shape active layer is 1500-3000 Å;

material of the first transparent conductive thin film in the step 4, material of the second transparent conductive thin film in the step 6 are ITO, and thicknesses are 400-1000 Å.

The present invention further provides a manufacture method of an in-cell self capacitive touch control display panel, comprising steps of:

step 1, providing a substrate and deposing a first metal layer on the substrate, and implementing pattern process to the first metal layer to form a gate scan line and a gate in one with the gate scan line;

the gate scan line is also employed to be a touch scanning line;

step 2, deposing a gate isolation layer on the gate scan line and the gate, and deposing a semiconductor layer on the gate isolation layer, then implementing pattern process to the semiconductor layer to form an island shape active layer;

step 3, deposing a second metal layer on the island shape active layer and the gate isolation layer, then implementing pattern process to the second metal layer to form a data line, and a source in one with the data line and connected with the island shape active layer, a drain connected to the island shape active layer;

the gate, the source, the drain and the island shape active layer construct a TFT;

the data line is also employed to be a touch receiving line;

step 4, deposing a first transparent conductive thin film on the gate isolation layer, the data line, the source and the drain, then implementing pattern process to the first transparent conductive thin film to form a plurality of pixel electrodes aligned in array, and each pixel electrode is correspondingly coupled to the drain of one TFT;

the pixel electrode is also employed to be a touch control self capacitance;

step 5, deposing an insulation protective layer on the data line, the pixel electrode, the source and the drain, and implementing pattern process to the insulation protective layer;

step 6, depositing a second transparent conductive thin film on the insulation protective layer, and implementing pattern process to the second transparent conductive thin film to form a whole sheet common electrode located opposite to all the pixel electrodes, and the whole sheet common electrode is provided with a plurality of long strip via holes in a region corresponding to each pixel electrode.

manufacture of the array substrate is accomplished;

step 7, providing a CF substrate, and oppositely assembling the CF substrate and the array substrate, and injecting liquid crystals to form a liquid crystal layer;

wherein in the step 1, the first metal layer is deposed by physical vapor deposition, and the pattern process to the first metal layer comprises photoresist coating, and implementing exposure, development, wet etching and photoresist stripping with a mask;

in the step 2, the gate isolation layer and the semiconductor layer are deposed by plasma enhanced chemical vapor deposition, and the pattern process to the semiconductor layer comprises photoresist coating, and implementing exposure, development, dry etching and photoresist stripping with a mask;

in the step 3, the second metal layer is deposed by physical vapor deposition, and the pattern process to the second metal layer comprises exposure, development, wet etching and photoresist stripping;

in the step 4, the first transparent conductive thin film is deposed by physical vapor deposition, and the pattern process to the first transparent conductive thin film comprises exposure, development, wet etching and photoresist stripping;

in the step 5, the insulation protective layer is deposed by plasma enhanced chemical vapor deposition, and the pattern process to the insulation protective layer comprises photoresist coating, and implementing exposure, development, dry etching and photoresist stripping with a mask;

in the step 6, the second transparent conductive thin film is deposed by physical vapor deposition, and the pattern process to the second transparent conductive thin film comprises photoresist coating, and implementing exposure, development, wet etching and photoresist stripping;

wherein material of the first metal in the step 1, material of the second metal layer in the step 3 are one or more combination of molybdenum, aluminum and copper, and thicknesses are 3000-6000 Å;

wherein material of the gate isolation layer in the step 2, material of the insulation protective layer in the step 5 are Silicon Nitride, and thicknesses are 2000-5000 Å; material of the semiconductor layer in the step 2 is amorphous silicon and n-type heavy doped amorphous silicon, and a thickness is 1500-3000 Å;

material of the first transparent conductive thin film in the step 4, material of the second transparent conductive thin film in the step 6 are ITO, and thicknesses are 400-1000 Å.

The benefits of the present invention are: in the in-cell self capacitive touch control display panel and the manufacture method thereof provided by the present invention, a touch scanning line is commonly shared with the gate scan line, and a touch receiving line is commonly shared with the data line, and a touch control self capacitance is commonly shared with the pixel electrode, under the premise of not adding more to the present process flow of the array substrate, the in-cell self capacitive touch control function can be realized and the driving cost of the panel can be reduced.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

The present invention first provides an in-cell self capacitive touch control display panel, comprising: an array substrate, a CF substrate and a liquid crystal layer arranged between the array substrate and the CF substrate, and light is incident from a CF substrate side, and exits out of an array substrate side.

Figure 1:
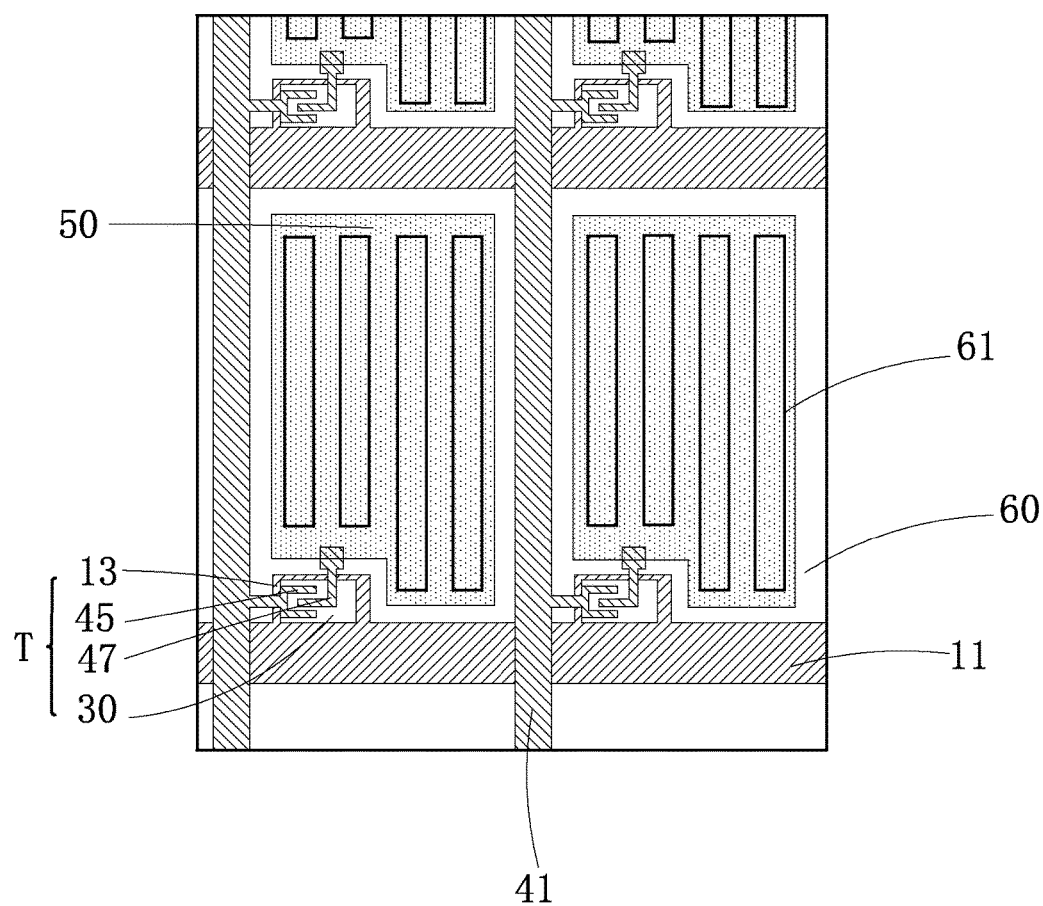
FIG. 1 is a top view diagram of an array substrate of an in-cell self capacitive touch control display panel according to the present invention.

Please refer to FIG. 1. The array substrate comprises:

a plurality of gate scan lines 11 separately arranged along a horizontal direction;

a plurality of data lines 41 separately arranged along a vertical direction, and the plurality of gate scan lines 11 separately arranged along the horizontal direction and the plurality of data lines 41 separately arranged along the vertical direction are mutually insulated and staggered to divide a plurality of sub pixel areas;

a plurality of pixel electrodes 50 aligned in array, and each pixel electrode 50 is correspondingly located in one sub pixel area, and the pixel electrode 50 is flat;

a TFT T correspondingly located to each pixel electrode 50;

and a whole sheet common electrode 60 located opposite to all the pixel electrodes 50, and the whole sheet common electrode 60 is provided with a plurality of long strip via holes 61 in a region corresponding to each pixel electrode 50 for forming a transverse electrical field between the pixel electrodes 50 and the whole sheet common electrode 60.

A gate isolation layer (not shown) covers the gate scan line 11, a gate 13 of the TFT T; the data line 41 is located on the gate isolation layer; an island shape active layer 30 of the TFT is located on the gate isolation layer; a source 45 and a drain 47 of the TFT T are respectively coupled to the island shape active layer 30; the pixel electrode 50 is located on the gate isolation layer and coupled to a drain 47 of the TFT T. An insulation protective layer (not shown) covers the data line 41, the pixel electrode 51, the source 45 and the drain 47 of the TFT T; the whole sheet common electrode 60 is paved on the insulation protective layer.

Specifically, all materials of the gate scan line 11, the data line 41, and the gate 13, the source 45, the drain 47 of the TFT T are one or more combination of molybdenum (Mo), aluminum (Al) and copper (Cu), and all thicknesses are 3000-6000 Å; both materials of the pixel electrode 50 and the common electrode 60 are Indium Tin Oxide (ITO), and both thicknesses are 400-1000 Å; both materials of the gate isolation layer and the insulation protective layer are Silicon Nitride (SiNx), and both thicknesses are 2000-5000 Å; material of the island shape active layer 30 is amorphous silicon and n-type heavy doped amorphous silicon, and a thickness of the island shape active layer is 1500-3000 Å.

Particularly, a touch scanning line is commonly shared with the gate scan line 11, and a touch receiving line is commonly shared with the data line 41, and a touch control self capacitance is commonly shared with the pixel electrode 50. Under the premise of not adding more to the present process flow of the array substrate, the in-cell self capacitive touch control function can be realized.

Figure 2:
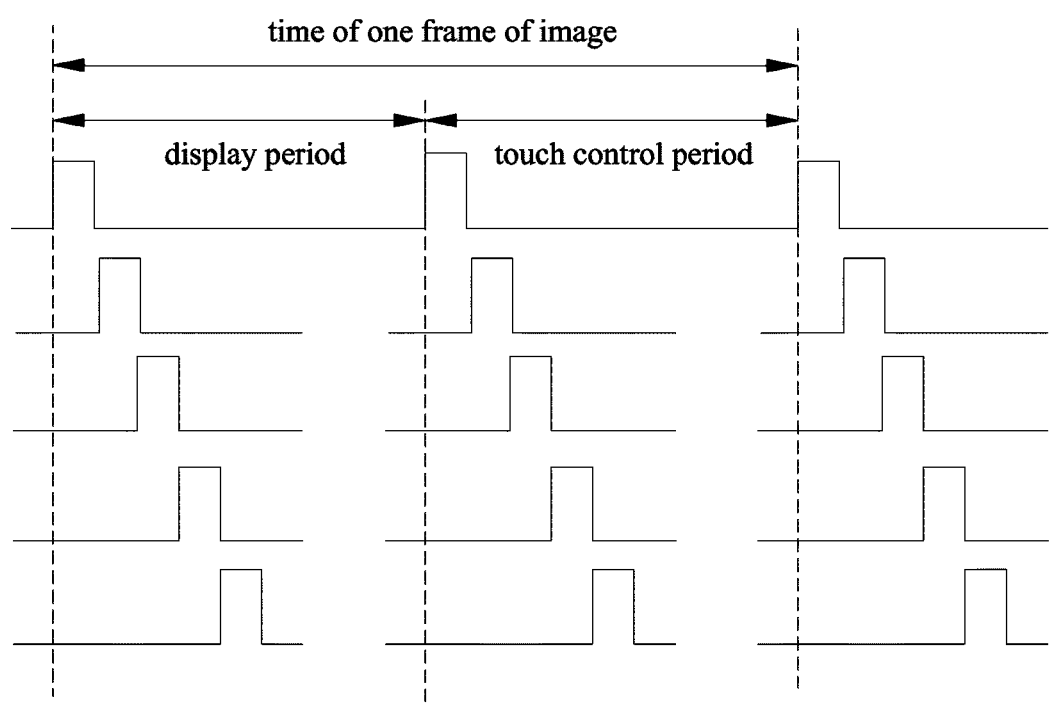
FIG. 2 is a driving sequence diagram of an in-cell self capacitive touch control display panel according to the present invention.
Figure 3:
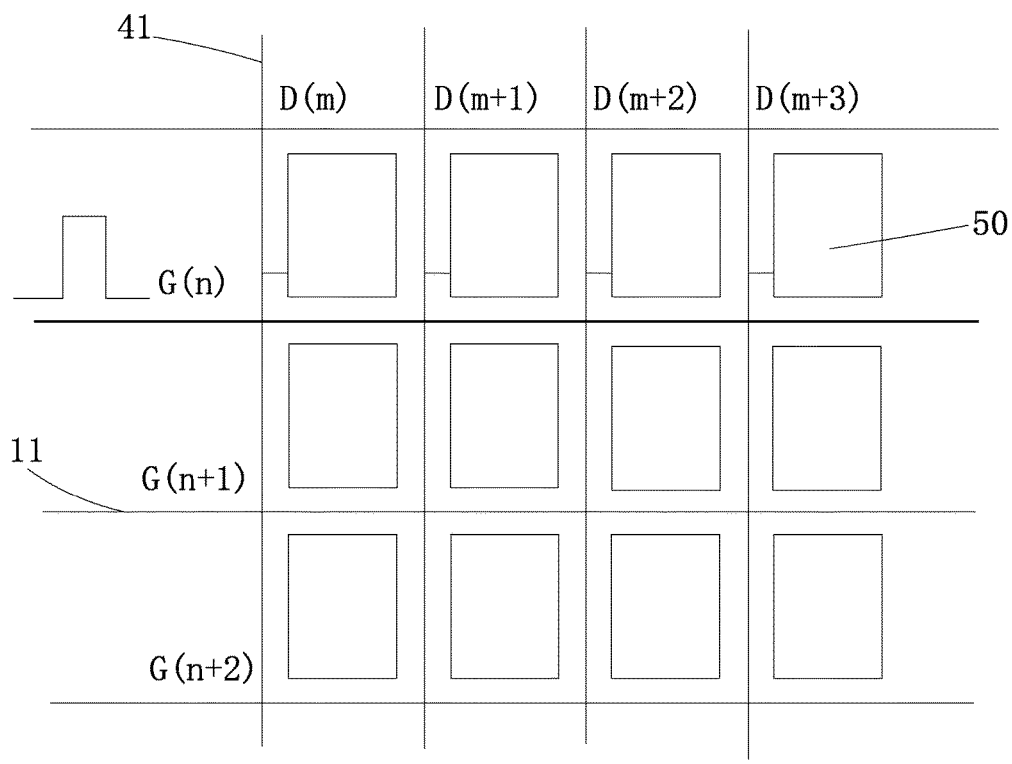
FIG. 3 is a touch control driving principle diagram of an in-cell self capacitive touch control display panel according to the present invention.

Please refer to FIG. 2 and FIG. 3 at the same time. The in-cell self capacitive touch control display panel of the present invention performs display and touch control in time division. That is to say that time of one frame of image is divided into a display period and a touch control period; in the display period, the gate scan line 11 transmits a gate scan signal, and the data line 41 transmits a pixel gray scale signal, and the pixel electrode 50 is employed to form a storage capacitor and a liquid crystal capacitor for normally display images; in the touch control period, the gate scan line 11 is employed to be the touch scanning line to transmit a touch scanning signal, and the data line 41 is employed to be the touch receiving line to sense a touch signal, and the pixel electrode 50 is employed to be the touch control self capacitance for realizing the in-cell self capacitive touch control function.

Specifically, as shown in FIG. 3, in the touch control period, supposing that the nth gate scan line 11 transmits a touch scanning signal G(n), and all TFTs in the nth row is on, the respective pixel electrodes 50 in the nth row are respectively conducted with one corresponding data line 41 through one TFT, and pulse signals are respectively transmitted with respective data lines 41. At this moment, if the finger touches the pixel electrode 50 at the nth row and mth column (m is an positive integer), the capacitance at the pixel electrode 50 will be affected, and meanwhile, the pulse signal D(m) transmitted in the mth data line 41 conducted with the pixel electrode 50 changes with sensing the difference of the capacitance. In other words, the mth data line 41 is employed to be the touch receiving signal to sense a touch signal. Accordingly, the position where the touch signal is can be determined.

Both the gate scan signal and the touch scanning signal are provided by the gate driver. There is no need to add the additional driving control part for realizing the touch control function, and the driving cost of the panel can be reduced.

The structure of the CF substrate is the same as the CF substrate in the IPS type liquid crystal display panel according to prior art, and comprises components of color film photoresist, a black matrix, photospacers and alignment films. The detail description is omitted here.

Figure 4:
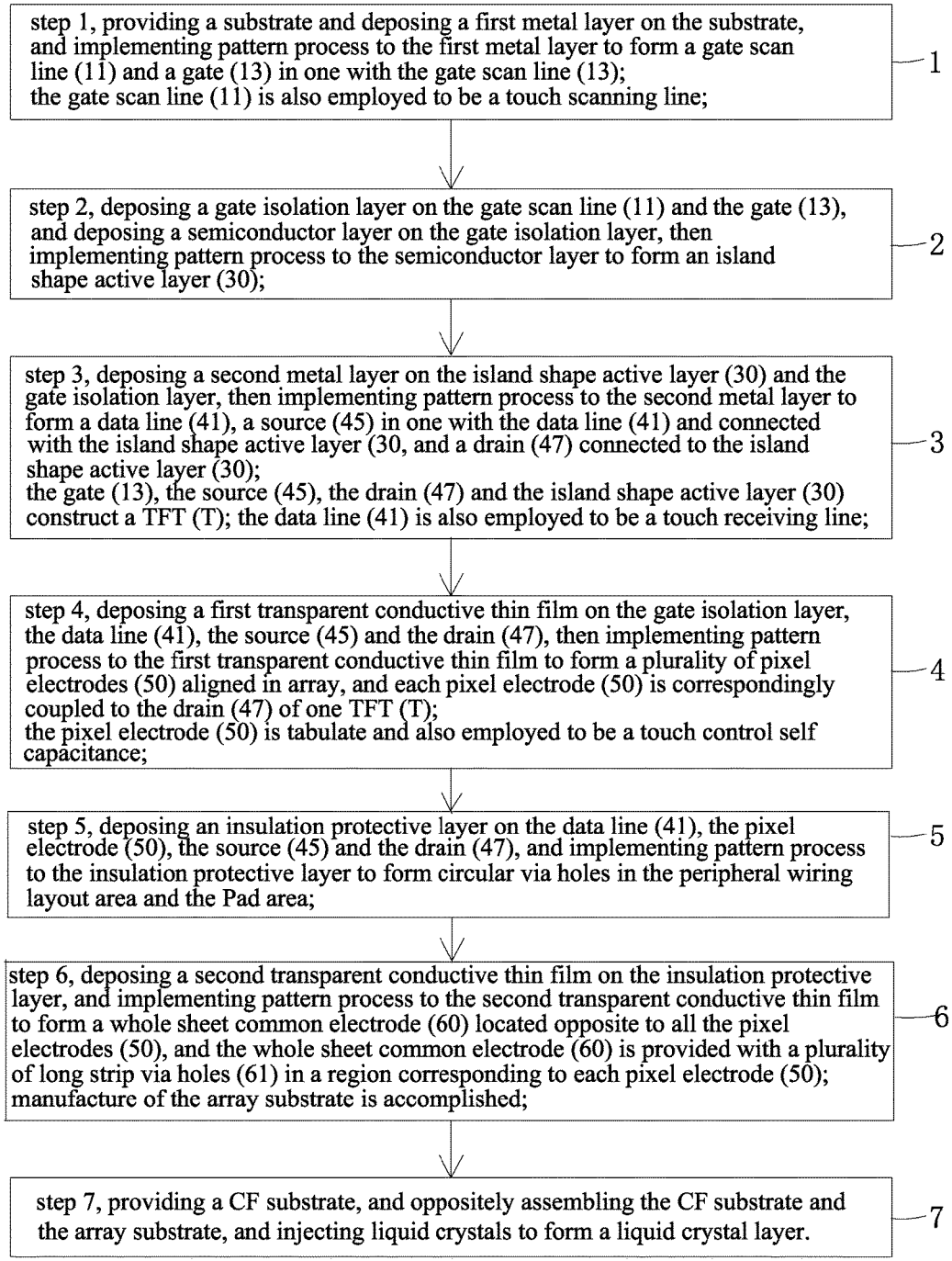
FIG. 4 is a flowchart of a manufacture method of an in-cell self capacitive touch control display panel according to the present invention.
Figure 5:
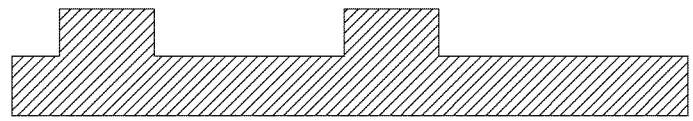
FIG. 5 is a diagram of the step 1 in the manufacture method of the in-cell self capacitive touch control display panel according to the present invention.
Figure 5:
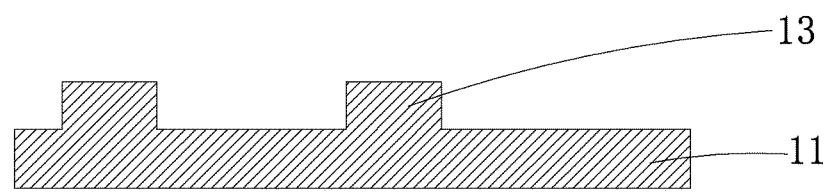

Please refer to FIG. 4. The present invention further provides a manufacture method of an in-cell self capacitive touch control display panel, comprising steps of:

step 1, as shown in FIG. 5, providing a substrate and deposing a first metal layer on the substrate, and implementing pattern process to the first metal layer to form a gate scan line 11 and a gate 13 in one with the gate scan line 13; the gate scan line 11 is also employed to be a touch scanning line.

Specifically, in the step 1, the first metal layer is deposed by physical vapor deposition (PVD), and the pattern process to the first metal layer comprises photoresist coating, and implementing exposure, development, wet etching and photoresist stripping with a mask.

Figure 6:
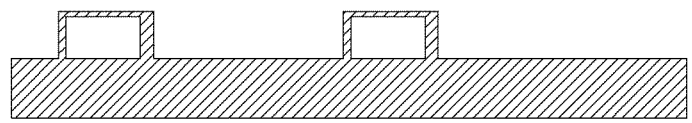
FIG. 6 is a diagram of the step 2 in the manufacture method of the in-cell self capacitive touch control display panel according to the present invention.
Figure 6:
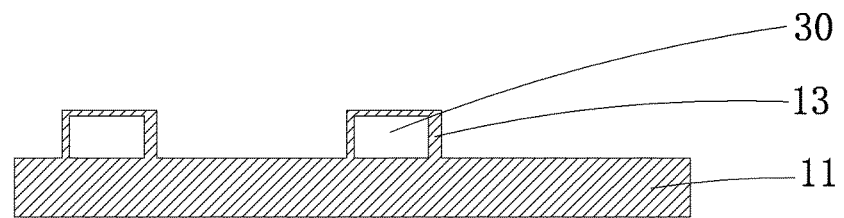

Material of the first metal layer is one or more combination of Mo, Al and Cu, and a thickness is 3000-6000 Å.

step 2, as shown in FIG. 6, deposing a gate isolation layer on the gate scan line 11 and the gate 13, and deposing a semiconductor layer on the gate isolation layer, then implementing pattern process to the semiconductor layer to form an island shape active layer 30.

Specifically, in the step 2, the gate isolation layer (not shown) and the semiconductor layer are deposed by plasma enhanced chemical vapor deposition (PECVD), and the pattern process to the semiconductor layer comprises photoresist coating, and implementing exposure, development, dry etching and photoresist stripping with a mask.

Figure 7:
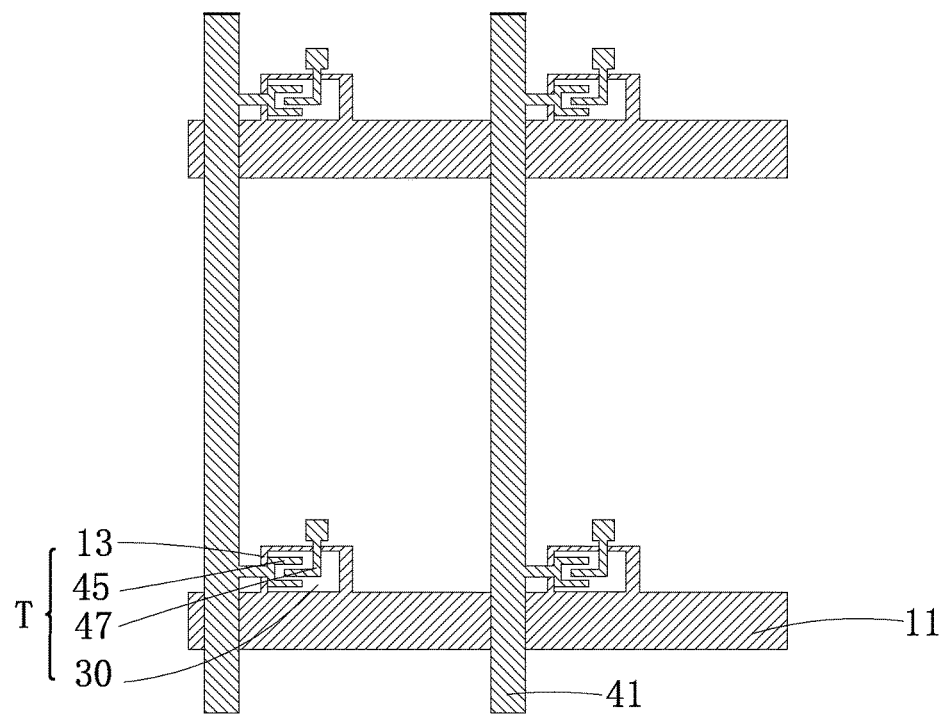
FIG. 7 is a diagram of the step 3 in the manufacture method of the in-cell self capacitive touch control display panel according to the present invention.

Material of the gate isolation layer is SiNx, and a thickness is 2000-5000 Å; material of the semiconductor layer is amorphous silicon and n-type heavy doped amorphous silicon, and a thickness is 1500-3000 Å.

step 3, as shown in FIG. 7, deposing a second metal layer on the island shape active layer 30 and the gate isolation layer, then implementing pattern process to the second metal layer to form a data line 41, and a source 45 in one with the data line 41 and connected with the island shape active layer 30, a drain 47 connected to the island shape active layer 30. The gate 13, the source 45, the drain 47 and the island shape active layer 30 construct a TFT T. The data line 41 is also employed to be a touch receiving line.

Specifically, in the step 3, the second metal layer is deposed by PVD, and the pattern process to the second metal layer comprises exposure, development, wet etching and photoresist stripping.

Figure 8:
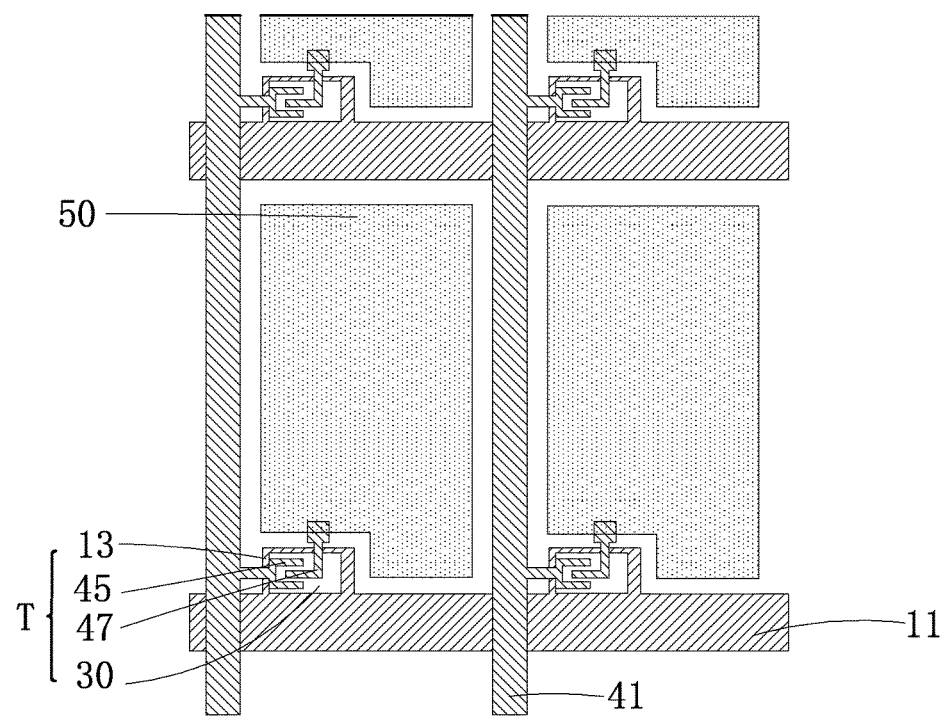
FIG. 8 is a diagram of the step 4 in the manufacture method of the in-cell self capacitive touch control display panel according to the present invention.

Material of the second metal layer is one or more combination of Mo, Al and Cu, and a thickness is 3000-6000 Å.

step 4, as shown in FIG. 8, deposing a first transparent conductive thin film on the gate isolation layer, the data line 41, the source 45 and the drain 47, then implementing pattern process to the first transparent conductive thin film to form a plurality of pixel electrodes 50 aligned in array, and each pixel electrode 50 is correspondingly coupled to the drain 47 of one TFT T. The pixel electrode 50 is flat and also employed to be a touch control self capacitance.

Specifically, in the step 4, the first transparent conductive thin film is deposed by PVD, and the pattern process to the first transparent conductive thin film comprises exposure, development, wet etching and photoresist stripping.

Material of the first transparent conductive thin film is ITO, and a thickness is 400-1000 Å.

step 5, deposing an insulation protective layer (not shown) on the data line 41, the pixel electrode 50, the source 45 and the drain 47, and implementing pattern process to the insulation protective layer to form circular via holes in the peripheral wiring layout area and the Pad area.

Specifically, in the step 5, the insulation protective layer is deposed by PECVD, and the pattern process to the insulation protective layer comprises photoresist coating, and implementing exposure, development, dry etching and photoresist stripping with a mask.

Figure 9:
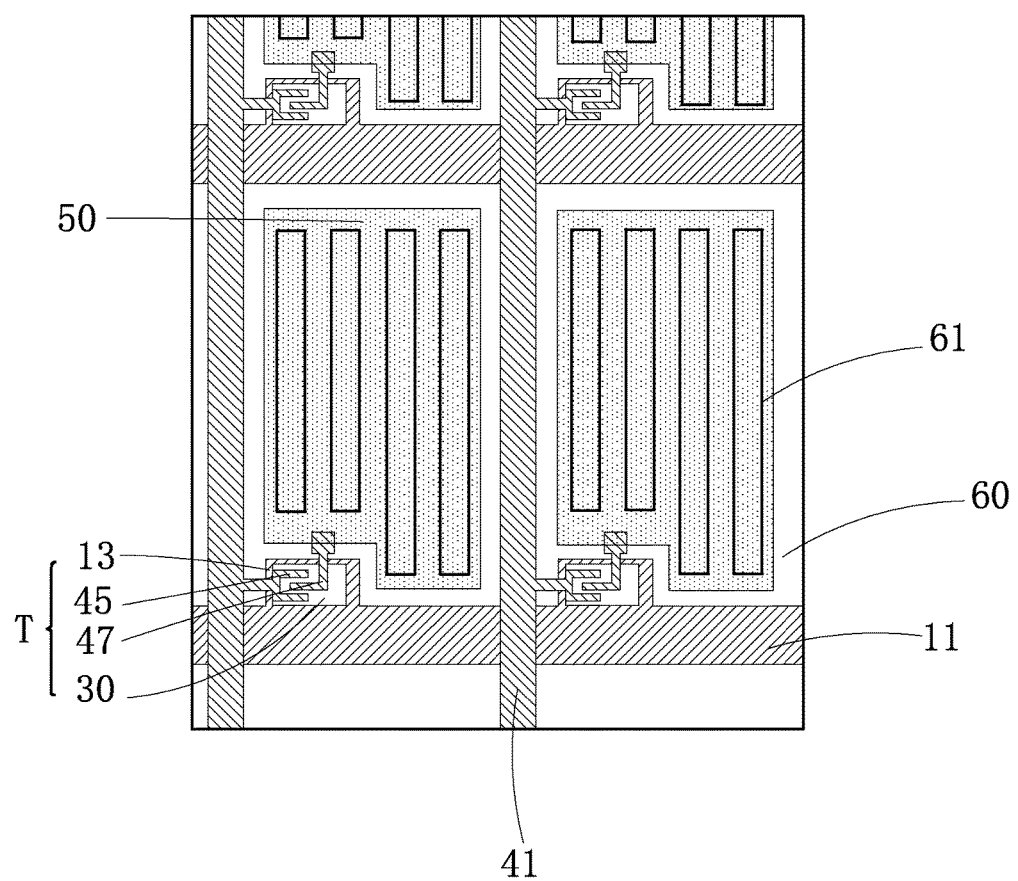
FIG. 9 is a diagram of the step 6 in the manufacture method of the in-cell self capacitive touch control display panel according to the present invention.

Material of the insulation protective layer is SiNx, and a thickness is 2000-5000 Å.

step 6, as shown in FIG. 9, deposing a second transparent conductive thin film on the insulation protective layer, and implementing pattern process to the second transparent conductive thin film to form a whole sheet common electrode 60 located opposite to all the pixel electrodes 50, and the whole sheet common electrode 60 is provided with a plurality of long strip via holes 61 in a region corresponding to each pixel electrode 50; manufacture of the array substrate is accomplished.

Specifically, in the step 6, the second transparent conductive thin film is deposed by PVD, and the pattern process to the second transparent conductive thin film comprises photoresist coating, and implementing exposure, development, wet etching and photoresist stripping.

Material of the second transparent conductive thin film is ITO, and a thickness is 400-1000 Å.

step 7, providing a CF substrate, and oppositely assembling the CF substrate and the array substrate, and injecting liquid crystals to form a liquid crystal layer.

The aforesaid method of the in-cell self capacitive touch control display panel does not add more to the process flow. The manufactured in-cell self capacitive touch control display panel performs display and touch control in time division. That is to say that time of one frame of image is divided into a display period and a touch control period; in the display period, the gate scan line 11 transmits a gate scan signal, and the data line 41 transmits a pixel gray scale signal, and the pixel electrode 50 is employed to form a storage capacitor and a liquid crystal capacitor for normally display images; in the touch control period, the gate scan line 11 is employed to be the touch scanning line to transmit a touch scanning signal, and the data line 41 is employed to be the touch receiving line to sense a touch signal, and the pixel electrode 50 is employed to be the touch control self capacitance for realizing the in-cell self capacitive touch control function. Both the gate scan signal and the touch scanning signal are provided by the gate driver. There is no need to add the additional driving control part for realizing the touch control function, and the driving cost of the panel can be reduced.

In conclusion, in the in-cell self capacitive touch control display panel and the manufacture method thereof according to the present invention, a touch scanning line is commonly shared with the gate scan line, and a touch receiving line is commonly shared with the data line, and a touch control self capacitance is commonly shared with the pixel electrode, under the premise of not adding more to the present process flow of the array substrate, the in-cell self capacitive touch control function can be realized and the driving cost of the panel can be reduced.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. An in-cell self capacitive touch control display panel, comprising: an array substrate, a CF substrate and a liquid crystal layer arranged between the array substrate and the CF substrate, and light is incident from a CF substrate side, and exits out of an array substrate side;
    the array substrate comprises: a plurality of gate scan lines separately arranged along a horizontal direction, a plurality of data lines separately arranged along a vertical direction, and a plurality of pixel electrodes aligned in array, and the plurality of gate scan lines separately arranged along the horizontal direction and the plurality of data lines separately arranged along the vertical direction are mutually insulated and staggered to divide a plurality of sub pixel areas; each pixel electrode is correspondingly located in one sub pixel area;
    a touch scanning line is commonly shared with the gate scan line, and a touch receiving line is commonly shared with the data line, and a touch control self capacitance is commonly shared with the pixel electrode;
    time of one frame of image is divided into a display period and a touch control period; in the display period, the gate scan line transmits a gate scan signal, and the data line transmits a pixel gray scale signal, and the pixel electrode is employed to form a storage capacitor and a liquid crystal capacitor; in the touch control period, the gate scan line is employed to be the touch scanning line to transmit a touch scanning signal, and the data line is employed to be the touch receiving line to sense a touch signal, and the pixel electrode is employed to be the touch control self capacitance.

2. The in-cell self capacitive touch control display panel according to claim 1, wherein the array substrate further comprises: a TFT located correspondingly to each pixel electrode, and a plurality of common electrodes located opposite to the pixel electrodes;
    a gate isolation layer covering the gate scan line, a gate of the TFT, and the data line is located on the gate isolation layer, and an island shape active layer of the TFT is located on the gate isolation layer, and a source and a drain of the TFT are respectively coupled to the island shape active layer, and the pixel electrode is located on the gate isolation layer and coupled to a drain of the TFT, and an insulation protective layer covering the data line, the pixel electrode, the source and the drain of the TFT, and the common electrode is paved on the insulation protective layer.

3. The in-cell self capacitive touch control display panel according to claim 2, wherein the pixel electrode is flat, and the common electrode has a whole sheet structure covering all the sub pixel areas; the common electrode is provided with a plurality of long strip via holes in a region corresponding to each pixel electrode.

4. The in-cell self capacitive touch control display panel according to claim 2, wherein all materials of the gate scan line, the data line, and the gate, the source, the drain of the TFT are one or more combination of molybdenum, aluminum and copper, and all thicknesses are 3000-6000 Å.

5. The in-cell self capacitive touch control display panel according to claim 2, wherein both materials of the pixel electrode and the common electrode are ITO, and both thicknesses are 400-1000 Å.

6. The in-cell self capacitive touch control display panel according to claim 2, wherein both materials of the gate isolation layer and the insulation protective layer are Silicon Nitride, and both thicknesses are 2000-5000 Å; material of the island shape active layer is amorphous silicon and n-type heavy doped amorphous silicon, and a thickness of the island shape active layer is 1500-3000 Å.

7. A manufacture method of an in-cell self capacitive touch control display panel, comprising steps of:
   step 1, providing a substrate and deposing a first metal layer on the substrate, and implementing pattern process to the first metal layer to form a gate scan line and a gate in one with the gate scan line;
   the gate scan line is also employed to be a touch scanning line;
   step 2, deposing a gate isolation layer on the gate scan line and the gate, then deposing a semiconductor layer on the gate isolation layer, and implementing pattern process to the semiconductor layer to form an island shape active layer;
   step 3, deposing a second metal layer on the island shape active layer and the gate isolation layer, then implementing pattern process to the second metal layer to form a data line, a source in one with the data line and connected with the island shape active layer, and a drain connected to the island shape active layer;
   the gate, the source, the drain and the island shape active layer construct a TFT;
   the data line is also employed to be a touch receiving line;
   step 4, deposing a first transparent conductive thin film on the gate isolation layer, the data line, the source and the drain, then implementing pattern process to the first transparent conductive thin film to form a plurality of pixel electrodes aligned in array, and each pixel electrode is correspondingly coupled to the drain of one TFT;
   the pixel electrode is also employed to be a touch control self capacitance;
   step 5, deposing an insulation protective layer on the data line, the pixel electrode, the source and the drain, and implementing pattern process to the insulation protective layer;
   step 6, deposing a second transparent conductive thin film on the insulation protective layer, and implementing pattern process to the second transparent conductive thin film to form a whole sheet common electrode located opposite to all the pixel electrodes, and the whole sheet common electrode is provided with a plurality of long strip via holes in a region corresponding to each pixel electrode manufacture of the array substrate is accomplished;
   step 7, providing a CF substrate, and oppositely assembling the CF substrate and the array substrate, and injecting liquid crystals to form a liquid crystal layer.

8. The manufacture method of the in-cell self capacitive touch control display panel according to claim 7, wherein in the step 1, the first metal layer is deposed by physical vapor deposition, and the pattern process to the first metal layer comprises photoresist coating, and implementing exposure, development, wet etching and photoresist stripping with a mask;
   in the step 2, the gate isolation layer and the semiconductor layer are deposed by plasma enhanced chemical vapor deposition, and the pattern process to the semiconductor layer comprises photoresist coating, and implementing exposure, development, dry etching and photoresist stripping with a mask;
   in the step 3, the second metal layer is deposed by physical vapor deposition, and the pattern process to the second metal layer comprises exposure, development, wet etching and photoresist stripping;
   in the step 4, the first transparent conductive thin film is deposed by physical vapor deposition, and the pattern process to the first transparent conductive thin film comprises exposure, development, wet etching and photoresist stripping;
   in the step 5, the insulation protective layer is deposed by plasma enhanced chemical vapor deposition, and the pattern process to the insulation protective layer comprises photoresist coating, and implementing exposure, development, dry etching and photoresist stripping with a mask;
   in the step 6, the second transparent conductive thin film is deposed by physical vapor deposition, and the pattern process to the second transparent conductive thin film comprises photoresist coating, and implementing exposure, development, wet etching and photoresist stripping.

9. The manufacture method of the in-cell self capacitive touch control display panel according to claim 7, wherein material of the first metal in the step 1, material of the second metal layer in the step 3 are one or more combination of molybdenum, aluminum and copper, and thicknesses are 3000-6000 Å.

10. The manufacture method of the in-cell self capacitive touch control display panel according to claim 7, wherein material of the gate isolation layer in the step 2, material of the insulation protective layer in the step 5 are Silicon Nitride, and thicknesses are 2000-5000 Å; material of the semiconductor layer in the step 2 is amorphous silicon and n-type heavy doped amorphous silicon, and a thickness of the island shape active layer is 1500-3000 Å;
   material of the first transparent conductive thin film in the step 4, material of the second transparent conductive thin film in the step 6 are ITO, and thicknesses are 400-1000 Å.

11. A manufacture method of an in-cell self capacitive touch control display panel, comprising steps of:
   step 1, providing a substrate and deposing a first metal layer on the substrate, and implementing pattern process to the first metal layer to form a gate scan line and a gate in one with the gate scan line;
   the gate scan line is also employed to be a touch scanning line;
   step 2, deposing a gate isolation layer on the gate scan line and the gate, then deposing a semiconductor layer on the gate isolation layer, and implementing pattern process to the semiconductor layer to form an island shape active layer;
   step 3, deposing a second metal layer on the island shape active layer and the gate isolation layer, then implementing pattern process to the second metal layer to form a data line, a source in one with the data line and connected with the island shape active layer, and a drain connected to the island shape active layer;
   the gate, the source, the drain and the island shape active layer construct a TFT;
   the data line is also employed to be a touch receiving line;

step 4, deposing a first transparent conductive thin film on the gate isolation layer, the data line, the source and the drain, then implementing pattern process to the first transparent conductive thin film to form a plurality of pixel electrodes aligned in array, and each pixel electrode is correspondingly coupled to the drain of one TFT;

the pixel electrode is also employed to be a touch control self capacitance;

step 5, deposing an insulation protective layer on the data line, the pixel electrode, the source and the drain, and implementing pattern process to the insulation protective layer;

step 6, deposing a second transparent conductive thin film on the insulation protective layer, and implementing pattern process to the second transparent conductive thin film to form a whole sheet common electrode located opposite to all the pixel electrodes, and the whole sheet common electrode is provided with a plurality of long strip via holes in a region corresponding to each pixel electrode manufacture of the array substrate is accomplished;

step 7, providing a CF substrate, and oppositely assembling the CF substrate and the array substrate, and injecting liquid crystals to form a liquid crystal layer;

wherein in the step 1, the first metal layer is deposed by physical vapor deposition, and the pattern process to the first metal layer comprises photoresist coating, and implementing exposure, development, wet etching and photoresist stripping with a mask;

in the step 2, the gate isolation layer and the semiconductor layer are deposed by plasma enhanced chemical vapor deposition, and the pattern process to the semiconductor layer comprises photoresist coating, and implementing exposure, development, dry etching and photoresist stripping with a mask;

in the step 3, the second metal layer is deposed by physical vapor deposition, and the pattern process to the second metal layer comprises exposure, development, wet etching and photoresist stripping;

in the step 4, the first transparent conductive thin film is deposed by physical vapor deposition, and the pattern process to the first transparent conductive thin film comprises exposure, development, wet etching and photoresist stripping;

in the step 5, the insulation protective layer is deposed by plasma enhanced chemical vapor deposition, and the pattern process to the insulation protective layer comprises photoresist coating, and implementing exposure, development, dry etching and photoresist stripping with a mask;

in the step 6, the second transparent conductive thin film is deposed by physical vapor deposition, and the pattern process to the second transparent conductive thin film comprises photoresist coating, and implementing exposure, development, wet etching and photoresist stripping;

wherein material of the first metal in the step 1, material of the second metal layer in the step 3 are one or more combination of molybdenum, aluminum and copper, and thicknesses are 3000-6000 Å;

wherein material of the gate isolation layer in the step 2, material of the insulation protective layer in the step 5 are Silicon Nitride, and thicknesses are 2000-5000 Å; material of the semiconductor layer in the step 2 is amorphous silicon and n-type heavy doped amorphous silicon, and a thickness is 1500-3000 Å;

material of the first transparent conductive thin film in the step 4, material of the second transparent conductive thin film in the step 6 are ITO, and thicknesses are 400-1000 Å.

\* \* \* \* \*